United States Patent
Hatlelid et al.

(10) Patent No.: US 8,984,597 B2
(45) Date of Patent: Mar. 17, 2015

(54) PROTECTING USER CREDENTIALS USING AN INTERMEDIARY COMPONENT

(75) Inventors: Kristjan E. Hatlelid, Sammamish, WA (US); Marc R. Barbour, Woodinville, WA (US); Magnus Bo Gustaf Nyström, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 12/789,160

(22) Filed: May 27, 2010

(65) Prior Publication Data

US 2011/0296510 A1 Dec. 1, 2011

(51) Int. Cl.
*H04L 29/00* (2006.01)
*G06F 21/62* (2013.01)
*H04L 29/06* (2006.01)
*H04L 9/32* (2006.01)
*H04L 29/08* (2006.01)

(52) U.S. Cl.
CPC ........ *G06F 21/6218* (2013.01); *G06F 21/6263* (2013.01); *G06F 2221/2105* (2013.01); *G06F 2221/2115* (2013.01); *G06F 2221/2141* (2013.01); *H04L 63/08* (2013.01); *H04L 63/0884* (2013.01); *H04L 63/166* (2013.01); *H04L 9/3226* (2013.01); *H04L 2209/80* (2013.01); *H04L 67/142* (2013.01)
USPC .................................. 726/5; 726/8; 713/176

(58) Field of Classification Search
USPC .......................................... 726/5, 8; 713/176
See application file for complete search history.

(56) References Cited

U.S. PATENT DOCUMENTS

| 7,200,665 | B2 | 4/2007 | Eshghi et al. |
| 7,461,398 | B2 | 12/2008 | Aaron |
| 7,869,591 | B1 | 1/2011 | Nagel et al. |
| 8,219,808 | B2 | 7/2012 | Belohoubek et al. |
| 2003/0046391 | A1 | 3/2003 | Moreh et al. |
| 2003/0084168 | A1 | 5/2003 | Erickson et al. |

(Continued)

FOREIGN PATENT DOCUMENTS

EP 1924047 B1 * 4/2012

OTHER PUBLICATIONS

"Identity Manager and the Single Sign-on Service", *MSDN*, retrieved from <http://msdn.microsoft.com/en-us/library/bb972911.aspx> on Nov. 22, 2011, 4 pages.

(Continued)

*Primary Examiner* — Brandon Hoffman
*Assistant Examiner* — Michael D Anderson
(74) *Attorney, Agent, or Firm* — Timothy Churna; Kate Drakos; Micky Minhas (57) ABSTRACT

An access component sends an access request to an intermediary component, the access request being a request to access a service or resource without credentials of a current user of the intermediary component being revealed to the access component. The intermediary component obtains user credentials, for the current user, that are associated with the service or resource. The access request and the user credentials are sent to the service or resource, and in response session state information is received from the service or resource. The session state information is returned to the access component, which allows the access component and the service or resource to communicate with one another based on the session state information and independently of the first component.

26 Claims, 6 Drawing Sheets

(56) References Cited

U.S. PATENT DOCUMENTS

| | | | |
|---|---|---|---|
| 2003/0097331 A1 | 5/2003 | Cohen | |
| 2003/0158960 A1 | 8/2003 | Engberg | |
| 2003/0172090 A1 | 9/2003 | Asunmaa et al. | |
| 2004/0088578 A1 | 5/2004 | Chao et al. | |
| 2005/0177867 A1* | 8/2005 | Toutonghi | 726/7 |
| 2005/0283608 A1 | 12/2005 | Halcrow et al. | |
| 2006/0041759 A1 | 2/2006 | Kaliski et al. | |
| 2006/0129817 A1 | 6/2006 | Borneman et al. | |
| 2006/0236382 A1 | 10/2006 | Hinton et al. | |
| 2007/0204168 A1 | 8/2007 | Cameron et al. | |
| 2007/0234417 A1 | 10/2007 | Blakley, III et al. | |
| 2008/0091950 A1* | 4/2008 | Hofmann et al. | 713/176 |
| 2008/0130523 A1 | 6/2008 | Fridman et al. | |
| 2008/0155267 A1 | 6/2008 | Lieber | |
| 2008/0189778 A1 | 8/2008 | Rowley | |
| 2008/0229384 A1 | 9/2008 | Hodgkinson et al. | |
| 2008/0313719 A1 | 12/2008 | Kaliski et al. | |
| 2009/0249439 A1 | 10/2009 | Olden et al. | |
| 2009/0292927 A1 | 11/2009 | Wenzel et al. | |
| 2010/0122333 A1 | 5/2010 | Noe | |
| 2010/0146611 A1* | 6/2010 | Kuzin et al. | 726/8 |
| 2010/0325441 A1 | 12/2010 | Laurie et al. | |
| 2011/0247045 A1 | 10/2011 | Rajagopal et al. | |
| 2011/0265172 A1* | 10/2011 | Sharma et al. | 726/8 |
| 2012/0023556 A1 | 1/2012 | Schultz et al. | |
| 2013/0205360 A1 | 8/2013 | Novak | |

OTHER PUBLICATIONS

Audun, Josang et al., "Usability and Privacy in Identity Management Architectures", *ACSW '07 Proceedings of the fifth Australasian symposium on ACSW frontiers*, retrieved from <http://portal.acm.org/citation.cfm?id=1274548> on Nov. 22, 2011,(Jan. 30, 2007), 10 pages.

Bustamante, Michele L., "Building a Custom Security Token Service", *MSDN Magazine*, retrieved from <http://msdn.microsoft.com/en-us/magazine/dd347547.aspx> on Nov. 22, 2011, 12 pages.

Rescorla, E. et al., "Transport Layer Security (TLS) Renegotiation Indication Extension", *Internet Engineering Task Force (IETF), RFC 5746*, Available at <http://tools.ietf.org/html/rfc5746>, (Feb. 2010), pp. 1-15.

Salowey, J. et al., "Transport Layer Security (TLS) Session Resumption without Server-Side State", *Network Working Group, RFC 5077*, Available at <http://tools.ietf.org/html/rfc5077>,(Jan. 2008), pp. 1-21.

Mishra, Sidharth., "OpenSSO Architecture Overview", Retrieved at << http://wikis.sun.com/display/OpenSSO/OpenSSO+Architecture+Overview#OpenSSOArchitectureOverview-4.8Security%3ACredentialsandDelegation >>, Jun. 20, 2008, pp. 1-9.

Vassilev, et al., "Personal Brokerage of Web Service Access", Retrieved at << http://ieeexplore.ieee.org/stamp/stamp.jsp?tp=&arnumber=4336275 >>, IEEE Security and Privacy, vol. 5, No. 5, Sep. 2007, pp. 24-31.

Mizuno, et al., "A Mobile Phone Based Authentication Service for Home Appliances", Retrieved at << http://ieeexplore.ieee.org/stamp/stamp.jsp?tp=&arnumber=4199324 >>, 4th IEEE Consumer Communications and Networking Conference, Jan. 2007, pp. 1168-1169.

"CAS—Central Authentication Service", Retrieved at << http://www.jusfortechies.com/cas/protocol.html >>, Retrieved Date: Mar. 16, 2010, pp. 1-9.

Kondi, Shesh., "OpenSSO and Secure SOA", Retrieved at << http://wikis.sun.com/download/attachments/64224471/OpenSSO-SSOA.pdf >>, Retrieved Date: Mar. 16, 2010, pp. 29.

"RoboForm Enterprise Password Management: Solutions Overview", Retrieved from: <http://www.roboform.com/enterprise/solutions/overview> on Apr. 20, 2010, 3 pages.

"RoboForm", Retrieved from: <http://www.roboform.com/tutorial-password.html> on Apr. 20, 2010, 2 pages.

"PCT Search Report and Written Opinion", Application No. PCT/US2013/022611, (May 14, 2013), 9 pages.

"Non-Final Office Action", U.S. Appl. No. 13/368,731, Aug. 18, 2014, 36 pages.

* cited by examiner

PROTECTING USER CREDENTIALS USING AN INTERMEDIARY COMPONENT

BACKGROUND

As computers have become increasingly commonplace, it has become desirable for users to access resources on the World Wide Web (also referred to as simply the Web) or other services from a variety of different computers. These resources or other services oftentimes allow a user to provide user credentials, such as a user name and password, in order to access the resource or service. However, some of the computers that a user may use to access these resources are not trusted by the user. Users oftentimes are hesitant to use such untrusted computers because they are fearful of having their user credentials obtained by a malicious program running on the untrusted computer. This can result in user frustration and delays in accessing the resources or services that users desire.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a first component a first request is received from a second component. The first request is a request to access a service or resource without credentials of a current user being revealed to the second component. In response to the first request, user credentials for the current user are obtained at the first component, the user credentials being associated with the service or resource. Both the second request to access the service or resource and the user credentials are sent to the service or resource. In response to the second request, the first component receives session state information from the service or resource, and returns this session state information to the second component. The session state information allows the second component and the service or resource to communicate with each other independently of the first component.

In accordance with one or more aspects, in a first component a first request from a user of the first component is received. The first request is a request to access a service or resource without credentials of the user being revealed to the first component. In response to the first request, a second request to access the service or resource based on user credentials for the user is sent to a second component. In response to the second request, session state information is received from the second component. This session state information is session state information that was received by the second component from the service or resource. The first component communicates with the service or resource using the received session state information.

BRIEF DESCRIPTION OF THE DRAWINGS

The same numbers are used throughout the drawings to reference like features.

DETAILED DESCRIPTION

Protecting user credentials using an intermediary component is discussed herein. A user of a particular component, referred to as an access component (e.g., a program or a computing device) can request access to a particular service. The request is sent to an intermediary component, such as an intermediary program or computing device. The user credentials for the user that are associated with that particular service are obtained by the intermediary component, such as by receiving the user credentials from the user or retrieving user credentials previously received from the user at the intermediary component or another device. The intermediary component sends to the service both a request to access the service and the obtained user credentials. The service returns to the intermediary component session state information based on those user credentials, and the intermediary component sends the session state information to the access component. The access component and the service can then use the session state information to communicate with one another independently of the intermediary component, and without user credentials having been revealed to the access component.

Figure 1:
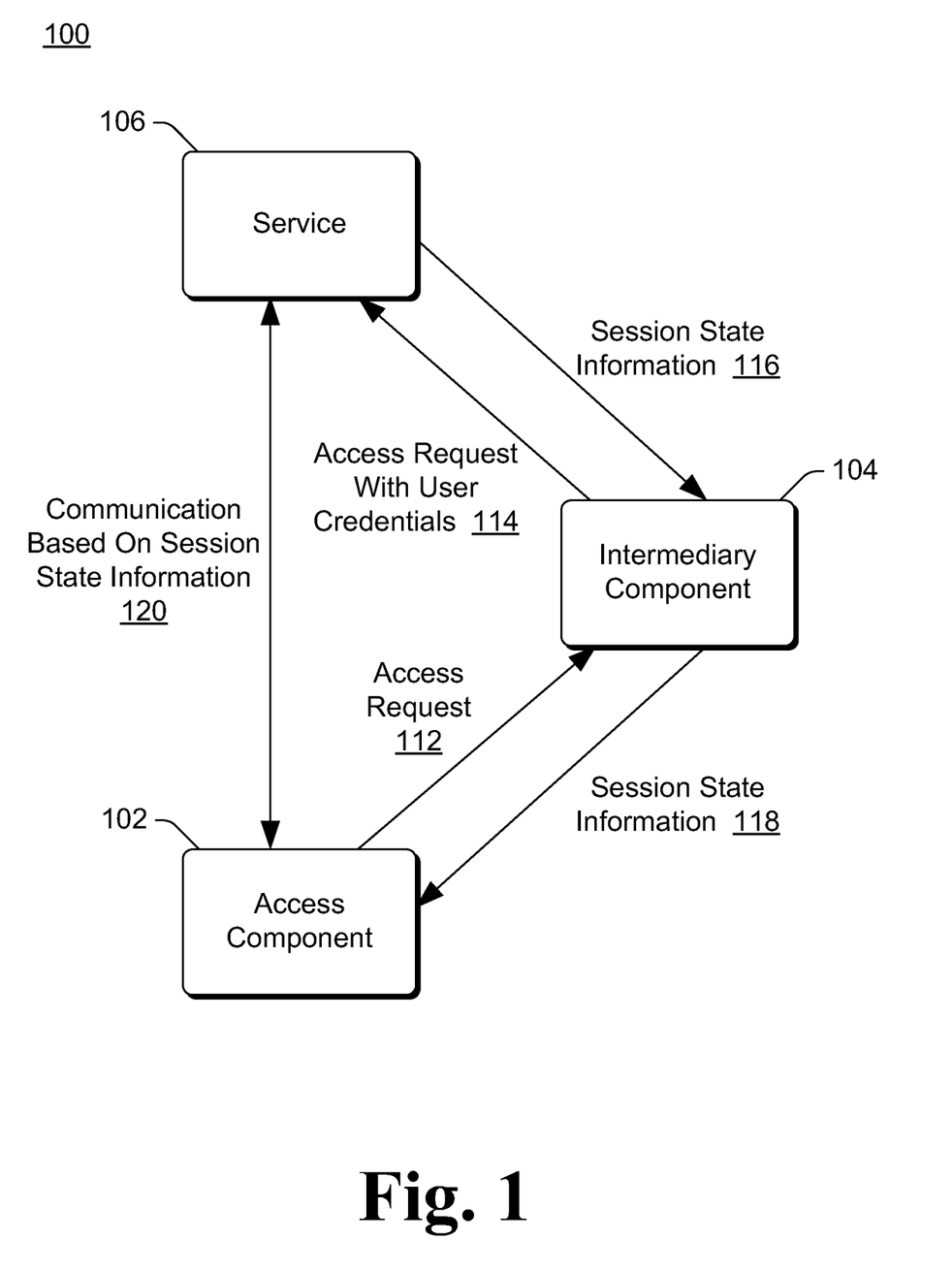
FIG. 1 illustrates an example system implementing the protecting user credentials using an intermediary component in accordance with one or more embodiments.

FIG. 1 illustrates an example system 100 implementing the protecting user credentials using an intermediary component in accordance with one or more embodiments. System 100 includes an access component 102, an intermediary component 104, and a service 106, each of which is implemented by one or more of a variety of different types of computing devices. For example, each of access component 102, intermediary component 104, and service 106 can be implemented by a desktop computer, a mobile station, an entertainment appliance, a set-top box communicatively coupled to a display device, a television, a laptop or netbook computer, a notepad computer, a cellular or other wireless phone, a game console, an automotive computer, and so forth. Although system 100 is illustrated with one access component 102, one intermediary component 104, and one service 106, system 100 can include any number of access components 102, any number of intermediary components 104, and any number of services 106.

In one or more embodiments, each of access component 102, intermediary component 104, and service 106 is implemented on a different computing device. Access component 102, intermediary component 104, and service 106 can be implemented by the same or different types of computing devices. In such embodiments, access component 102, intermediary component 104, and service 106 can communicate with one another via a variety of different networks, such as the Internet, a local area network (LAN), a phone network, an intranet, other public and/or proprietary networks, combinations thereof, and so forth. One or more of access component 102, intermediary component 104, and service 106 can also communicate with one another using different protocols or technologies, such as universal serial bus (USB) connections, wireless USB connections, infrared connections, Bluetooth connections, and so forth.

In other embodiments, one or more of access component 102, intermediary component 104, and service 106 can be implemented on the same computing device. For example, access component 102 and intermediary component 104 can be implemented on the same computing device. Access component 102 can be, for example, a web browser running on the computing device. Intermediary component 104 can be, for example, a trusted or otherwise secure program running on the same computing device. A secure program can run on a computing device in a variety of different manners, such as running in a particular ring or particular portion of memory of the computing device, running in a secure portion of memory of the computing device after having been verified by a trusted operating system of the computing device, running in a dedicated secure execution environment implemented in whole or in part in hardware, and so forth.

Access component 102 is a component that is typically less trusted by a user of system 100 (relative to intermediary component 104). For example, access component 102 can be a public computing device, such as computing device situated in a library, airport, internet café, and so forth. By way of another example, access component 102 can be a process that is running on a computing device but that is not running in a secure manner (e.g., is not running in a trusted portion of memory, is not verified by a trusted operating system, is not running in a dedicated secure execution environment implemented in whole or in part in hardware, and so forth).

Intermediary component 104 is a component that is typically more trusted by a user of system 100 (relative to access component 102). For example, intermediary component 104 can be a user's cellular or other wireless phone. By way of another example, intermediary component 104 can be a process that is running on a computing device in a secure manner (e.g., running in a trusted portion of memory, having been verified by a trusted operating system, and so forth).

Generally, a user is more comfortable with or has a higher degree of trust in intermediary component 104 than he or she is or has with access component 102. Therefore, the user is typically more comfortable inputting his or her user credentials to intermediary component 104 than to access component 102. The protecting user credentials using an intermediary component techniques discussed herein allow a user to use access component 102 to access service 106 based on his or her user credentials, but protects the user credentials by not having those user credentials (or any other credentials of the user) revealed to access component 102.

Service 106 can be any of a variety of different services or resources that access component 102, or a user of access component 102, may desire to access. Service 106 can provide a variety of different functionality. For example, service 106 can be a Web site that provides information or other services, such as a social networking Web site, an email Web site, and so forth. By way of another example, service 106 can provide access to other functionality or networks, such as access to a corporate network, access to a bank account, and so forth. Service 106 can also be a resource or an interface of a resource that access component 102, or a user of access component 102, may desire to access, such as a file share, a printer or other output device, a camera or other input device, and so forth. In order to access at least some of the functionality of service 106, user credentials for a user of access component 102 are provided to service 106. These user credentials can be a user name (also referred to as a user ID) and password for service 106. Alternatively these user credentials can be other types of user credentials, such as biometric data (e.g., fingerprint scans, retina scans, face scans, etc.), a digital certificate and/or other identifying data obtained from a smartcard of the user, other identifiers, certificates or tokens, and so forth. These user credentials authenticate the identity and/or role of a user of access component 102 to service 106.

To communicate with service 106 based on user credentials of a user of access component 102, access component 102 sends an access request 112 to intermediary component 104. Access request 112 can be sent in response to a user request to access service 106, or alternatively in response to other events (e.g., a request from a particular module of access component 102, a request from another component or device, and so forth). Access request 112 includes an indication of service 106, and can also include an indication of a particular type of communication with service 106 that is desired (e.g., a secure channel, simply logging into service 106, and so forth).

Intermediary component 104 receives access request 112, and in response to access request 112 intermediary component 104 obtains user credentials for a user of intermediary component 104. Intermediary component 104 protects the user credentials by not revealing the user credentials to access component 102, even though intermediary component 104 uses the user credentials to obtain session state information to be returned to access component 102. The user credentials can have been previously provided to and stored by intermediary component 104, or alternatively can be entered by a user of intermediary component 104 after access request 112 is received. These user credentials can optionally be sent only if a user of intermediary component 104 (which is also typically the user of access component 102) authorizes the user credentials to be sent, as discussed in more detail below.

Intermediary component 104 sends an access request with user credentials 114 to service 106. Access request with user credentials 114 includes the access requested in access request 112, as well as the user credentials for the user of intermediary component 104 that were obtained by intermediary component 104.

Service 106 receives access request with user credentials 114, and authenticates the received user credentials. The manner in which service 106 authenticates the user credentials can vary based on the nature of the user credentials. For example, if the user credentials are a user name and password, service 106 can authenticate the user credentials by verifying that the user name and password match a user name and password maintained by or otherwise accessible to service 106.

If the user credentials received by service 106 are authenticated by service 106, then service 106 returns session state information 116 to intermediary component 104. This session state information 116 can take a variety of different forms, dependent at least in part on the manner in which service 106 supports communications and/or the type of communication requested in access request 112 (and thus requested in access request with user credentials 114). The session state information 116 can be, for example, a cookie that can be used by access component 102 to access service 106, a secure socket layer (SSL) session state that can be used by access component 102 to access service 106 via a secure channel, a transport layer security (TLS) session state that can be used by access component 102 to access service 106 via a secure channel, and so forth.

Intermediary component 104 receives session state information 116. In response to receiving session state information 116, intermediary component 104 returns session state information 118 to access component 102. Session state information 118 is session state information 116 that component 104 received from service 106.

Access component 102 receives session state information 118, and can proceed with communication 120 with service 106 based on the received session state information 118. For example, access component 102 can communicate with service 106 using session state information included in a cookie received as session state information 118. This cookie can include, for example, an identifier to be used by access component 102 to indicate that the communications are associated with an account of the authenticated user, a cryptographic key to be used to encrypt communications sent to service 106, and so forth. By way of another example, access component 102 can communicate with service 106 using an SSL or TLS session state received as session state information 118. This SSL or TLS session state can include, for example, one or more cryptographic keys to be used to encrypt communications sent to service 106 and decrypt communications received from service 106, other data and identifiers (e.g., identifiers of service 106 and/or access component 102), and so forth.

As communication 120 is based on the received session state information 118, communication 120 is also based on the user credentials provided to service 106 by intermediary component 104. Communication 120 between access component 102 and service 106 is performed independently of intermediary component 104—communications 120 need not be, and typically are not, passed through intermediary component 104. Access component 102 maintains session state information 118 to communicate with service 106, then can delete session state information 118 when communication 120 is finished. Access component 102 can determine that communication 120 is finished in a variety of different manners, such as a user requesting to log out of or otherwise disconnect from service 106, receiving from service 106 an indication to log out or otherwise disconnect from service 106, when a threshold amount of time after receiving session state information 118 elapses, and so forth.

It should be noted that communication 120 is performed in the absence of user credentials of the user of access component 102 (which is typically also the user of intermediary component 104) being revealed to access component 102. The user credentials sent to service 106, as well as any other user credentials of the user, need not be revealed to access component 102. The user credentials are obtained by, and communicated to service 106 by, intermediary component 104. These user credentials are not sent to or otherwise revealed to access component 102.

It should also be noted that intermediary component 104 need not maintain a copy of session state information 116 or session state information 118. Intermediary component 104 operates to transfer or marshal the session state information received from service 106 to access component 102, after which intermediary component 104 no longer needs the session state information.

Alternatively, if the user credentials received by service 106 are not authenticated by service 106, then an indication that the requested access is denied is returned to intermediary component 104 rather than session state information 116. Additionally, intermediary component 104 returns an indication to access component 102 that the requested access is denied rather than session state information 118. Accordingly, access component 102 is not able to communicate with service 106 if the user credentials received by service 106 are not authenticated by service 106.

In the preceding discussion, it is indicated that intermediary component 104 need not maintain a copy of session state information 116 or session state information 118. Alternatively, intermediary component 104 does maintain session state information 116 or 118. If an access request 112 is received requesting access to a service 106 for which session state information 116 was previously obtained by intermediary component 104, then the previously obtained session state information 116 can be retrieved and returned to access component 102 as session state information 118. Thus, communications 120 can proceed between access component 102 and service 106 even though service 106 was not accessed to obtain session state information 116 in response to the most recent access request 112 received from access component 102.

Additionally, intermediary component 104 can return session state information that it maintains in response to an access request from a different access component (not shown). For example, a user of access component 102 could move to a new access component and have the new access component submit an access request to intermediary component 104, in response to which intermediary component 104 returns the session state information maintained by intermediary component 104. This new access component can then proceed to communicate with service 106 (analogous to communication 120, except that the communication is with a different access component than access component 102).

In other alternatives, intermediary component 104 maintains session state information 116, and in response to an access request 112 provides an access request and the maintained session state to service 106. Intermediary component 104 need not provide user credentials to service 106. In response to the access request and maintained session state sent to service 106, intermediary component 104 receives updated session state information. This updated session state information is maintained by intermediary component 104, and is also returned to access component 102 as session state information 118. Access component 102 uses this session state information 118, including the updated session state information received by intermediary component 104 from service 106, for communication 120 with service 106.

Figure 2:
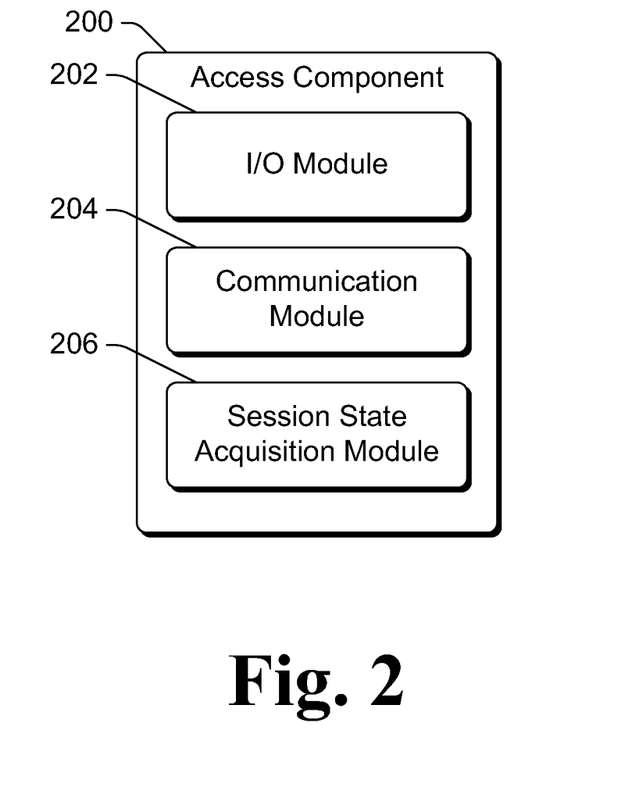
FIG. 2 illustrates an example access component in accordance with one or more embodiments.

FIG. 2 illustrates an example access component 200 in accordance with one or more embodiments. Access component 200 is referred to as an access component because it is used to access a service (such as service 106 of FIG. 1). Access component 200 includes an input/output (I/O) module 202, a communication module 204, and a session state acquisition module 206. It is to be appreciated that access component 200 can also include one or more additional components or modules for providing various functionality of component 200. Modules 202, 204, and 206 can be implemented in software, firmware, hardware, or combinations thereof. When implemented in software or firmware, each of modules 202, 204, and 206 includes one or more instructions that are executed by a processor or controller. Modules 202, 204, and 206 can be implemented as part of an operating system, or alternatively can be implemented separate from an operating system.

I/O module 202 receives user inputs from a user of access component 200. User inputs can be received in a variety of different manners, such as via a touchpad or touchscreen, via a keypad or keyboard, via a cursor control device, via a microphone, via physical feedback inputs (e.g., tapping a portion of a device including component 200, or other detected motions such as shaking or rotating of a device including component 200), and so forth. I/O module 202 also generates, manages, and/or outputs a user interface for access component 200. This user interface displays or otherwise presents various information to a user of access component 200, such as Web pages, Web browsing screens, secure file shares, secure printers, and so forth.

Communication module 204 manages receiving of communications from and sending of communications to other components or services, such as intermediary component 104 and service 106 of FIG. 1. Communication module 204 can support a variety of different technologies and protocols, including wireless and/or wired technologies and protocols, for communicating via a variety of different networks or other connections or couplings.

Session state acquisition module 206 communicates with an intermediary component (such as intermediary component 104 of FIG. 1) to obtain session state information for communicating with a service (such as service 106 of FIG. 1). Session state acquisition module 206 communicates an access request (such as access request 112 of FIG. 1) to an intermediary component in response to a user request to access a service or alternatively in response to other events. The particular service that access component 200 desires to access can be identified in different manners, such as based on an input received from a user (e.g., a uniform resource locator (URL) or other identifier of the service input by the user) or an identifier of the service received from another component or module.

In one or more embodiments, session state acquisition module 206 communicates with an intermediary component to obtain session state information for communicating with a service in response to a particular request to do so. Such a particular request can be received from a user of access component 200 or alternatively another component, module, or device. For example, a particular request can be user selection of an icon displayed by I/O module 202 or other user input that requests that user credentials be input to the service.

In one or more embodiments the service supports some communication that does not rely on user credentials, and some communication that does rely on user credentials. Session state information need not be obtained by access component 200 for communications that do not rely on user credentials. For example, the service can be a Web site that offers various products for sale, and allows access component 200 to communicate with the service and display the various products offered for sale without user credentials being input, but obtains user credentials in order for a user of access component 200 to purchase a product. A user can input different requests to access component 200 for different communications with the service. For example, I/O module 202 can display a Web browser window, and a user can enter a URL and then select a "search" button or an "enter" key in order to request communication without user credentials. In response to such inputs, access component 200 communicates with the service identified by the URL without user credentials. Access component 200 need not send an access request to the intermediary component, and need not obtain session state information from the intermediary component. However, if the user enters a URL and then selects a "user credentials" button or icon, or selects a "user credentials" button or icon after the service has already been accessed by access component 200, then access component 200 sends an access request to the intermediary component in order to communicate with the service identified by the URL based on the user credentials. Access component 200 can alternatively automatically detect that an access request is to be sent to the intermediary component in order to communicate with the service based on the user credentials, such as by automatically detecting the presence of a password field, by recognizing a particular URL or portion of a URL, and so forth.

Alternatively, session state acquisition module 206 can communicate with an intermediary component to obtain session state information for communicating with a service automatically. For example, session state acquisition module 206 can communicate with the intermediary component when a service is accessed (e.g., each time establishing of communication with a service is desired). If the user credentials provided to the service by the intermediary component are authenticated by the service, then the intermediary component returns the session state information to session state acquisition module 206. However, if the user credentials are not authenticated by the service, or the intermediary component does not send the user credentials to the service (e.g., because the intermediary component does not have or is unable to access or retrieve the user credentials, or because a user of the intermediary component does not authorize sending of the user credentials), then a denial response is returned to session state acquisition module 206. The denial response indicates to session state acquisition module 206 that the requested communication with the service is not permitted.

In one or more embodiments, situations can arise where some services are excluded from being used with the protecting user credentials using an intermediary component discussed herein. Such services could be excluded for different reasons, such as a user electing not to use the protecting user credentials using an intermediary component discussed herein with particular services, or an inability to apply the protecting user credentials using an intermediary component discussed herein to particular services. The services with which the protecting user credentials using an intermediary component discussed herein can be used can be identified in different manners. In one or more embodiments, the services with which the protecting user credentials using an intermediary component discussed herein can be used are identified to session state acquisition module 206 by the intermediary component. For example, the services for which the intermediary component has previously stored user credentials can be identified to session state acquisition module 206 by the intermediary component. In other embodiments, the services with which the protecting user credentials using an intermediary component discussed herein can be used can be identified to session state acquisition module 206 in different manners, such as identified by the services themselves, identified by another component, module, or device, and so forth.

Access component 200 and an intermediary component are paired together, allowing access component 200 to know which intermediary component to send access requests to and allowing the intermediary component to know which access component to return session state information to. Access component 200 and a particular intermediary component are paired together at least temporarily (e.g., at least long enough for access component 200 to obtain the session state information from the intermediary component). Session state acquisition module 206 identifies the particular intermediary component (if any) with which access component 200 is paired at any particular time.

Access component 200 and the intermediary component can identify one another in order to be paired together in a variety of different manners. In one or more embodiments, the intermediary component identifies itself to access component 200. This identification can be performed in a variety of different manners, such as via a wireless USB connection, a Bluetooth connection, an inter-process communication (in embodiments in which the access component and the intermediary component are implemented on the same computing device), and so forth. The intermediary component can determine the identity of access component 200 in order to identify itself to access component 200 in a variety of different manners, such as using a device discovery process (which can vary based on the particular technology or technique used for the access component 200 and the intermediary component to communicate with one another), a user of the intermediary component inputting to the intermediary component an identifier of access component 200 (e.g., an Internet Protocol (IP) address or other network address of access component 200), and so forth.

Alternatively, access component 200 can similarly determine the identity of the intermediary component. Access component 200 can determine the identity of the intermediary component in a variety of different manners, such as using a device discovery process (which can vary based on the particular technology or technique used for the access component 200 and the intermediary component to communicate with one another), a user of access component 200 inputting to access component 200 an identifier of the intermediary component, and so forth.

Access component 200 and the intermediary component can automatically identify one another, such as one or both components using a device discovery to attempt to discover the other at regular or irregular intervals (e.g., approximately every 30 seconds). Alternatively, access component 200 and the intermediary component can identify one another in response to a particular event (e.g., a user request to access a service).

It should be noted that no user credentials of a user of access component 200 need be input to access component 200. Access component 200 and the intermediary component identify one another and can communicate with one another without user credentials being input to access component 200. For example, a user of access component 200 need not input any user name and/or password to access component 200 in order for access component 200 to communicate with the intermediary component (or with the service).

Figure 3:
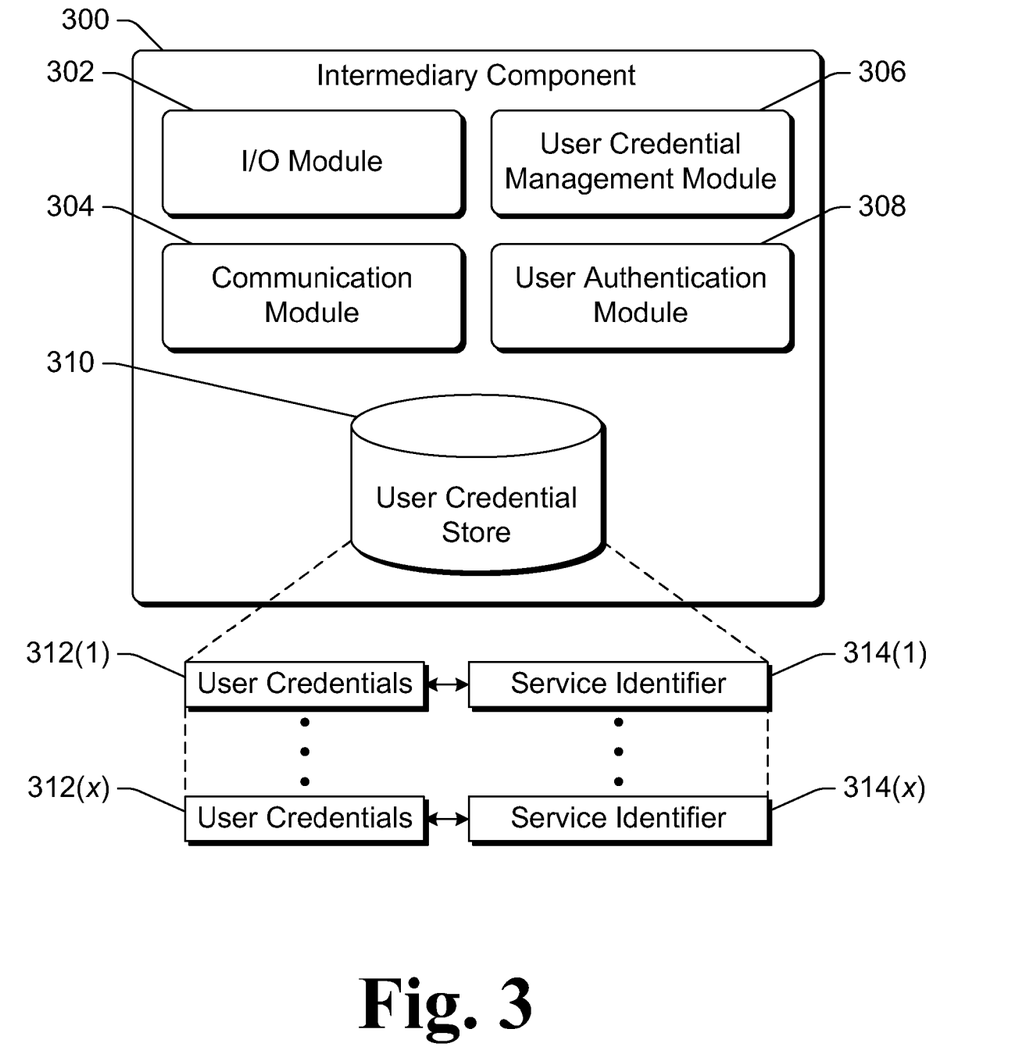
FIG. 3 illustrates an example intermediary component in accordance with one or more embodiments.

FIG. 3 illustrates an example intermediary component 300 in accordance with one or more embodiments. Intermediary component 300 includes an input/output (I/O) module 302, a communication module 304, a user credential management module 306, a user authentication module 308, and a user credential store 310. Intermediary component 300 can also optionally include a session state store (not shown), in which session state information maintained by intermediary component 300 is saved. It is to be appreciated that intermediary component 300 can also include one or more additional components or modules for providing various functionality of component 300. Modules 302, 304, 306, and 308 can be implemented in software, firmware, hardware, or combinations thereof. When implemented in software or firmware, each of modules 302, 304, 306, and 308 includes one or more instructions that are executed by a processor or controller. Modules 302, 304, 306, and 308 can be implemented as part of an operating system, or alternatively can be implemented separate from an operating system.

I/O module 302 receives user inputs from a user of intermediary component 300. User inputs can be received in a variety of different manners, analogous to the discussion above regarding I/O module 202 of access component 200. I/O module 302 also generates, manages, and/or outputs a user interface for intermediary component 300. This user interface displays or otherwise presents various information to a user of intermediary component 300, such as prompts to input user credentials, prompts to authorize sending of user credentials to a service (such as service 106 of FIG. 1), and so forth.

Communication module 304 manages receiving of communications from and sending of communications to other components or services, such as access component 102 and service 106 of FIG. 1. Communication module 304 can support a variety of different technologies and protocols, including wireless and/or wired technologies and protocols, for communicating via a variety of different networks or other connections or couplings.

User credential management module 306 manages user credentials that are maintained in user credential store 310, including retrieving user credentials, adding user credentials, and deleting user credentials. User credential store 310 can be implemented in a variety of different manners, such as using a database, a table, or other record. User credential store is typically, but need not be, maintained in nonvolatile memory, such as Flash memory, magnetic disk, and so forth. Although user credential store 310 is illustrated as part of intermediary component 300, alternatively user credential store is maintained on another component or device that is accessible to intermediary component 300.

In the example of FIG. 3, user credential store 310 includes multiple (x) user credentials 312, each of which is associated with a particular service 314. User credentials can be input to intermediary component 300 directly by user inputs received via I/O module 302. Alternatively, user credentials can be input to intermediary component 300 indirectly, such as being received by communication module 304 from another component or device. For example, a user can input user credentials to another computing device, and have those user credentials communicated to intermediary component 300. When user credentials are input indirectly, the user credentials can be received from a variety of different devices or components, such as another computing device, a smartcard coupled to intermediary component 300, a portable Flash memory device (e.g., a USB drive or thumb drive) coupled to intermediary component 300, a service (e.g., service 106 of FIG. 1), and so forth.

In other alternatives, user credentials are input to intermediary component 300 in other manners, such as being computed based on an initially provided value (e.g., provided by a user of intermediary component 300, provided by another component or device, etc.). For example, a seed value can be provided and the user credentials (e.g., a password) generated based on this seed value. The user credentials can be generated by intermediary component 300 or alternatively another component or device.

It should be noted that different services can require different types of user credentials. For example, one service may require just a password, but another service may require both a password and a digital certificate from a smartcard, and yet another service may require both a password and a fingerprint. These different credentials required for the different services are maintained in user credential store 310.

In one or more embodiments, user credentials associated with a particular service are received and stored in user credential store 310 prior to receipt of an access request from an access component (e.g., access component 102 of FIG. 1) to send the user credentials to that particular service (e.g., service 106 of FIG. 1). In such embodiments, user credential management module 306 stores the user credentials in user credential store 310, then retrieves the user credentials from user credential store 310 in response to receipt of an access request from an access component.

Alternatively, user credentials can be received via I/O module 302 when an access request to send user credentials to a service is received from an access component. For example, in response to receipt of an access request from an access component, user credential management module 306 can prompt (via I/O module 302) a user of intermediary component 300 for user credentials. The user inputs his or her user credentials, which are received by I/O module 302 and provided to user credential management module 306. User credential management module 306 can optionally store the received user credentials in user credential store 310 so that the user of intermediary component 300 need not re-enter his or her user credentials for a subsequently received access request.

Each of user credentials 312 is associated with one or more service identifiers 314. The service identifier 314 associated with particular user credentials 312 is an identifier (e.g., URL, IP address, file share name, etc.) of a particular service for which the particular user credentials can be used to authenticate the user of intermediary component 300. Although user credentials 312 are illustrated with a one-to-one association with service identifiers 314, alternatively particular user credentials 312 can be associated with multiple service identifiers 314, and/or a particular service identifier 314 can be associated with multiple user credentials 312.

The association of particular user credentials 312 to a particular service identifier 314 is typically identified when the user credentials are added to user credential store 310. The identification of the particular service 314 associated with particular user credentials 312 is typically received from the same source as the user credentials (e.g., a user of intermediary component 300, another computing device, a smartcard, and so forth). Alternatively, the identification of the particular service 314 associated with particular user credentials 312 can be received at different times and/or from different sources. For example, user credential management module 306 can receive user inputs via I/O module 302 to add a service identifier 314 as being associated with particular user credentials 312 previously stored in user credential store 310, or to change the service identifier 314 previously stored in user credential store 310 as associated with particular user credentials 312. By way of another example, particular user credentials 312 can be received from a user of intermediary component 300, and the particular service identifier 314 associated with the particular user credentials 312 can be received from a smartcard coupled to intermediary component 300.

When an access request to send user credentials to a service is received from an access component, user authentication module 308 identifies the user credentials to provide to the service. In one or more embodiments, the access request includes an indication of the service that the access component desires to access. User authentication module 308 retrieves, from user credential store 310, the user credentials 312 associated with the indicated service, and sends the retrieved user credentials 312 to the service with which the access component desires to communicate. Alternatively, the service that the access component desires to access can be identified in different manners, such as by a user of intermediary component 300, by the service itself, and so forth.

If the user credentials sent to the service are authenticated by the service, then session state information is returned to intermediary component 300 as discussed above. User authentication module 308 receives the session state information and returns the session state information to the access component from which the access request was received as discussed above. If the user credentials are not authenticated by the service, then a denial response is returned by the service to intermediary component 300. Alternatively, the request can be ignored by the service, in which case intermediary component 300 receives no response from the service. If a denial response is received from the service, or no response is received from the service within a threshold amount of time, then a denial response is returned to the access component from which the access request was received. The denial response indicates to the access component that it communication with the service based on the user credentials is not permitted.

Similarly, if user credentials associated with the service indicated in the access request received from the access component are not present in user credential store 310, and the user of intermediary component 300 does not provide user credentials associated with the service indicated in the access request received from the access component, then user authentication module 308 returns a denial response to the access component from which the access request was received. It should be noted that this association of user credentials with particular services in user credential store 310 provides additional protection for a user of intermediary component 310 against certain types of attacks, such as phishing attacks. If a user were to unintentionally attempt to access a fraudulent service using the access component (e.g., the user thinks they are accessing a Web service that allows access to their bank account, but has unintentionally entered an identifier of a fraudulent Web service), there would typically be no service identifier in user credential store 310 for that fraudulent service. User authentication module 308 would thus return a denial response to the access component from which the access request was received, preventing the user credentials from being communicated to the fraudulent service.

In one or more embodiments, user authentication module 308 automatically checks user credential store 310 for user credentials associated with the service indicated in the access request received from the access component, and sends a request with those user credentials to the service if the user credentials are present in user credential store 310. Alternatively, user authentication module 308 may obtain authorization from a user of intermediary component 300 to send the user credentials to the service. This authorization can be received in one or more of a variety of different manners, such as user selection of an "ok" button displayed to the user, user selection of a particular key, user entry of a password or personal identification number (PIN), a user providing his or her fingerprint, a user swiping his or her finger (or a stylus) in a particular pattern or direction, and so forth. The appropriate one or more of a PIN, password, fingerprint, etc. can be maintained by user authentication module 308, or alternatively can be included in user credential store 310. It should also be noted that different authorizations can be used for, and maintained in user credential store 310 for, different service identifiers 314 and/or user credentials 312. User authentication module 308 sends the user credentials to the service if the authorization to do so is received form a user of intermediary component 300; otherwise, user authentication module 308 does not send the user credentials to the service and returns a denial response to the access component from which the access request was received.

For example, in response to an access request received from an access component, an indication of the service indicated in the access request can be displayed by intermediary component 300. Intermediary component 300 can also prompt the user for authorization to send the user's user credentials associated with the indicated service to that service. At least part of the user's user credentials can also optionally be displayed (e.g., a user name associated with that service can be displayed). If the user enters his or her authorization (e.g., presses an "ok" button, enters the PIN expected by user authentication module 308, etc.) then user authentication module 308 sends the user credentials to the indicated service. If the user does not enter his or her authorization (e.g., presses a "decline" button, enters the wrong PIN, does not enter a PIN within a threshold amount of time, etc.), then user authentication module 308 does not send the user credentials to the indicated service.

In one or more embodiments, multiple different users can use intermediary component 300. Different user credentials 312 and associated service identifiers 314 can be maintained for these different users, such as in different user credentials stores 310 or in different portions or user credential store 310. The particular user at any given time of intermediary component 300 can be identified in different manners, such as by having the user login or otherwise identify himself or herself to intermediary component 300. Alternatively, the particular user can be inherent in the authorization provided by the user to have user credentials sent to the service. For example, different user credentials 312 (first and second user credentials 312) can be included in user credential store 310 for the same service identifier 314, but the different user credentials can be user credentials for different users. An indication of the manner in which authorization to send the user credentials is received (e.g., particular PINs or passwords to be received) is stored with the user credentials 312 and service identifiers 314. If a user of intermediary component 300 inputs the PIN associated with the first user credentials 312 associated with the particular service identifier 314, then the first user credentials 312 are sent to the service. However, if a user of intermediary component 300 inputs the PIN associated with the second user credentials associated with the particular service identifier 314, then the second user credentials 312 are sent to the service.

Figure 4:
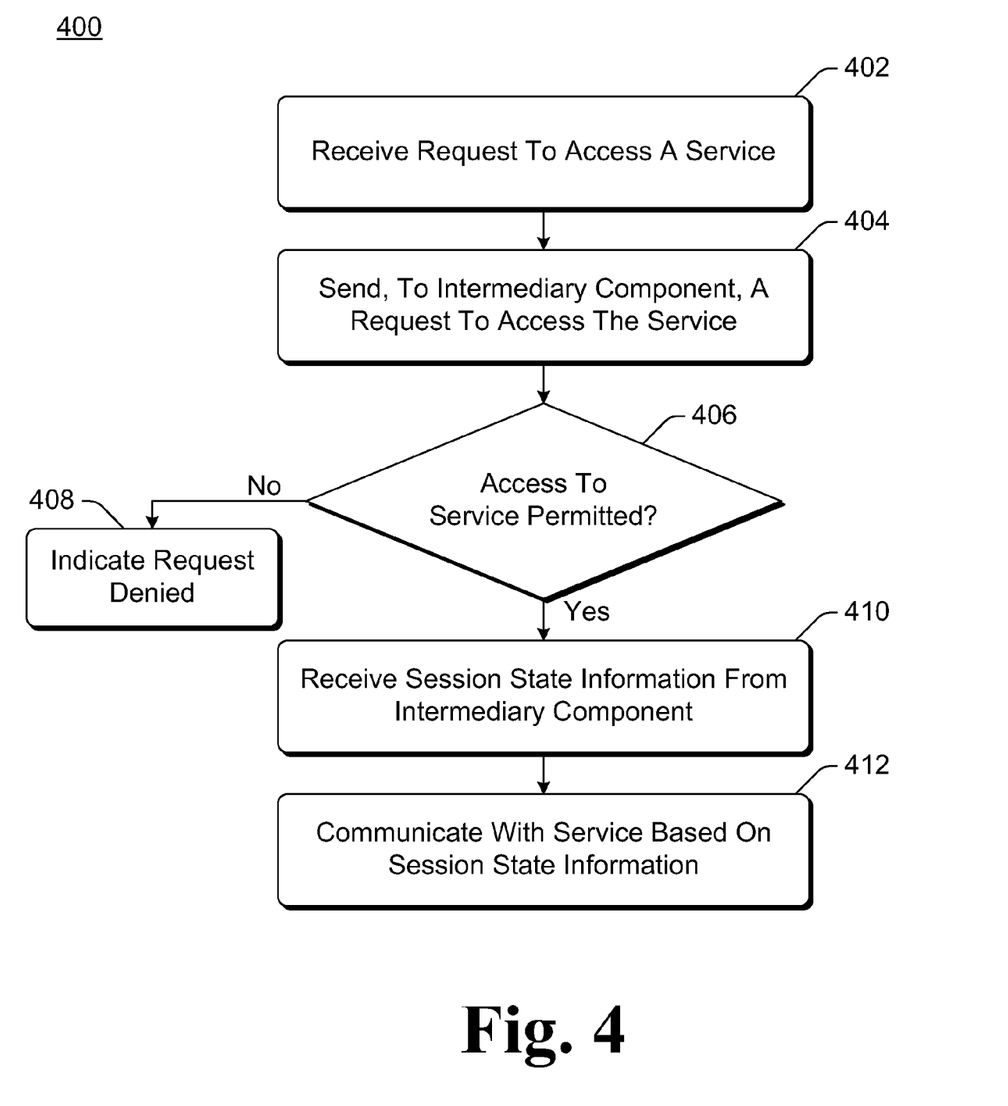
FIG. 4 is a flowchart illustrating an example process for protecting user credentials using an intermediary component in accordance with one or more embodiments.

FIG. 4 is a flowchart illustrating an example process 400 for protecting user credentials using an intermediary component in accordance with one or more embodiments. Process 400 is carried out by an access component, such as access component 102 of FIG. 1, and can be implemented in software, firmware, hardware, or combinations thereof. Process 400 is shown as a set of acts and is not limited to the order shown for performing the operations of the various acts. Process 400 is an example process for protecting user credentials using an intermediary component; additional discussions of protecting user credentials using an intermediary component are included herein with reference to different figures.

In process 400, a request to access a service is received (act 402). This request is typically a user request, but can alternatively be a request received from another component or module as discussed above.

A request to access the service is sent to an intermediary component (act 404). This request is referred to as an access request, and includes an indication of the service as discussed above. As discussed above, no credentials of a user of the access component implementing process 400 (which is typically also the user of the intermediary component) need be input to the access component.

Process 400 proceeds based on whether access to the service is permitted (act 406). If a denial response is received from the intermediary component, or alternatively if no response to the access request is received from the intermediary component within a threshold amount of time, then it is determined that access to the service is not permitted.

If access to the service is not permitted, then an indication that the request has been denied is returned (act 408). This indication can, for example, be displayed or otherwise presented to a user of the access component implementing process 400.

If access to the service is permitted, then session state information is received from the intermediary component (act 410). As discussed above, this session state information allows the access component to communicate with the service.

The access component proceeds to communicate with the service based on the received session state information (act 412). The communication between the access component and the service is based on the session state information, and thus is based on the user credentials provided to the service, although the user credentials are not revealed to the access component as discussed above.

Figure 5:
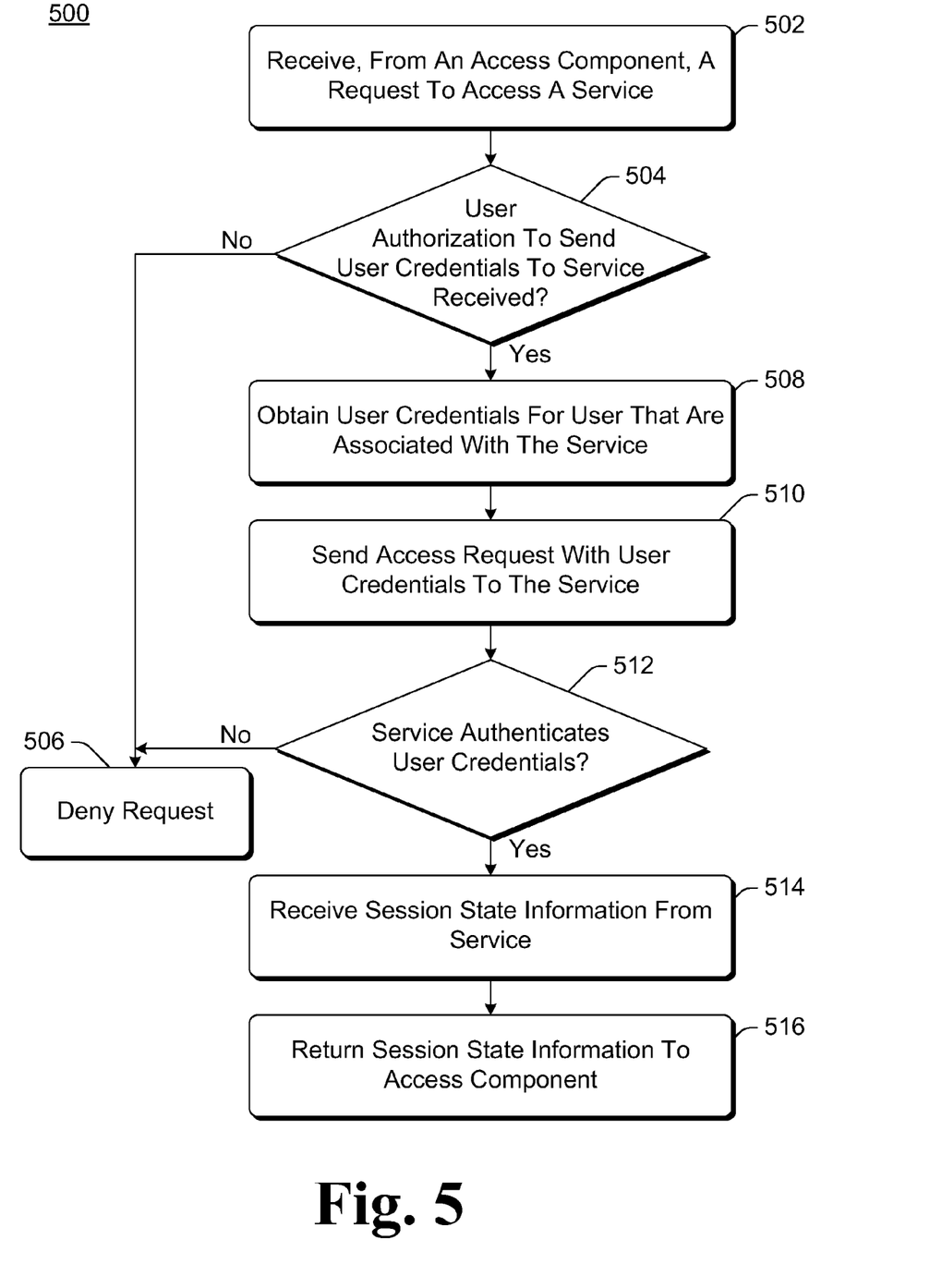
FIG. 5 is a flowchart illustrating another example process for protecting user credentials using an intermediary component in accordance with one or more embodiments.

FIG. 5 is a flowchart illustrating another example process 500 for protecting user credentials using an intermediary component in accordance with one or more embodiments. Process 500 is carried out by an intermediary component, such as intermediary component 104 of FIG. 1, and can be implemented in software, firmware, hardware, or combinations thereof. Process 500 is shown as a set of acts and is not limited to the order shown for performing the operations of the various acts. Process 500 is an example process for protecting user credentials using an intermediary component; additional discussions of protecting user credentials using an intermediary component are included herein with reference to different figures.

In process 500, a request to access a service is received from an access component (act 502). This request can include an indication of the service, as discussed above. Additionally, no credentials of the user of the access component (which is typically also the user of the intermediary component) need be input to the access component as discussed above.

A check is made as to whether user authorization to send user credentials to the service is received (act 504). This user authorization is an acknowledgment that accessing the service is desired by the user. The user of the intermediary component can acknowledge the request in different manners as discussed above, such as by pressing an "ok" button, entering a PIN, and so forth.

If user acknowledgement of the access request is not received, then the request is denied (act 506). A denial response can optionally be returned to the access component from which the access request was received.

However, if user acknowledgment of the access request is received, then user credentials that are for the current user of the intermediary device and that are associated with the indicated service are obtained (act 508). These user credentials can be obtained from a user credential store, as discussed above.

Both the access request and the obtained user credentials are sent to the service (act 510). Process 500 proceeds based on whether the service authenticates the user credentials (act 512). If the service does not authenticate the user credentials, then the request is denied (act 506).

However, if the service authenticates the user credentials, then session state information is received from the service (act 514). The session state information is returned to the access component (act 516). As discussed above, this session state information allows the access component to communicate with the service. The communication between the access component and the service is based on the session state information, and thus is based on the user credentials provided to the service, although the user credentials are not revealed to the access component as discussed above.

It should be noted that the check whether user authorization to send the user credentials to the service is received in act 504 is optional. In one or more embodiments, user credentials are sent to the service without checking whether user authorization to send the user credentials is received as discussed above.

Returning to FIG. 1, a variety of different usage scenarios are supported by the protecting user credentials using an intermediary component discussed herein. For example, access component 102 can be an untrusted public computer, intermediary component 104 can be a trusted cell phone, and service 106 can be a Web site. A user can access the Web site (e.g., to purchase an item), access a file, or other resource using the untrusted public computer and based on session state information obtained from his or her trusted cell phone. No credentials of the user need be entered at the untrusted public computer in order to access the Web site (e.g., and purchase the item).

By way of another example, access component 102 can be a Web browser on a computer, intermediary component 104 can be a trusted process on the same computer, and service 106 can be a Web site. A user can access the Web site (e.g., to purchase an item) using the Web browser and based on session state information obtained from the trusted process. No credentials of the user need be revealed to the Web browser in order to access the Web site (e.g., and purchase the item).

Figure 6:
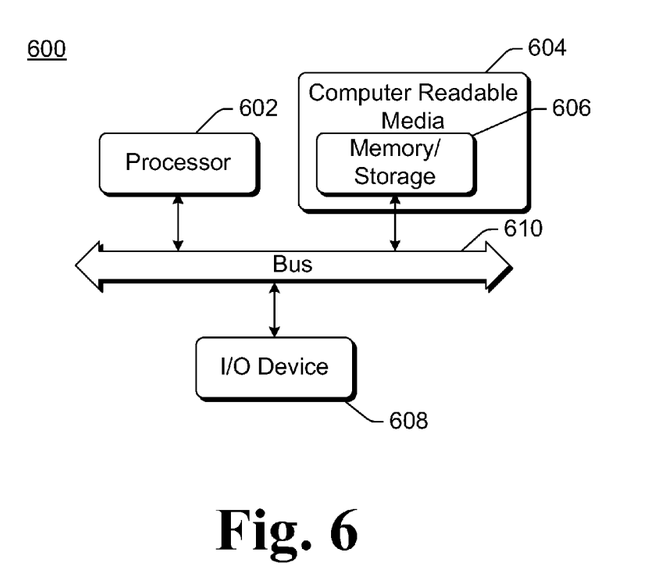
FIG. 6 illustrates an example computing device that can be configured to implement the protecting user credentials using an intermediary component in accordance with one or more embodiments.

FIG. 6 illustrates an example computing device 600 that can be configured to implement the protecting user credentials using an intermediary component in accordance with one or more embodiments. Computing device 600 can implement, for example, access component 102 of FIG. 1, intermediary component 104 of FIG. 1, service 106 of FIG. 1, access component 200 of FIG. 2, or intermediary component 300 of FIG. 3.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the protecting user credentials using an intermediary component techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by an intermediary component, the method comprising:

receiving, by the intermediary component and from an access component, a first request to access a service or resource without user credentials of a current user of the access component being revealed to the access component;

receiving, by the intermediary component, the user credentials of the current user of the access component, the intermediary component comprising a user credential management module and a user authentication module;

obtaining, by the intermediary component and in response to the first request, the user credentials for the current user, wherein the user credentials are associated with the service or resource, and the user credentials are managed by the user credential management module;

identifying, by the user authentication module, the user credentials to provide to the service;

sending, by the user authentication module of the intermediary component and to the service or resource, both a second request to access the service or resource and the user credentials;

receiving, by the intermediary component and in response to the second request, session state information from the service or resource; and returning, by the intermediary component, the session state information to the access component so that the access component and the service or resource can communicate with each other independently of the intermediary component.

2. A method as recited in claim 1, wherein the session state information allows the access component and the service or resource to communicate with one another without the user credentials being revealed to the access component.

3. A method as recited in claim 1, further comprising:
checking whether a user authorization to send the user credentials to the service or resource is received at the intermediary component; and
sending the user credentials to the service or resource only if the user authorization to send the user credentials to the service or resource is received at the intermediary component, otherwise returning an indication to the access component that the first request is denied.

4. A method as recited in claim 1, further comprising:
checking a user credential store of the intermediary component to determine whether user credentials associated with the service or resource are present in the user credential store; and
sending the user credentials to the service or resource only if user credentials associated with the service or resource are present in the user credential store, otherwise returning an indication to the access component that the first request is denied.

5. A method as recited in claim 4, wherein the user credential store is implemented as part of the intermediary component.

6. A method as recited in claim 1, wherein the user credentials were previously stored, in a user credential store of the intermediary component, as associated with the service or resource prior to receiving the first request.

7. A method as recited in claim 1, further comprising:
saving the session state information at the intermediary component;
receiving, from the access component, a third request to access the service or resource without the credentials of the current user of the access component being revealed to the access component;
retrieving the saved session state information; and
returning the retrieved session state information to the access component.

8. A method as recited in claim 1, further comprising:
saving the session state information at the intermediary component;
receiving, from a third component, a third request to access the service or resource without the credentials of the current user being revealed to the third component, wherein the third component and the access component are two different components;
retrieving the saved session state information; and
returning the retrieved session state information to the third component, wherein the returned session state information allows the third component and the service or resource to communicate with each other independently of the intermediary component.

9. A method as recited in claim 1, wherein the service or resource comprises a Web site.

10. A method as recited in claim 1, wherein the session state information comprises a cookie.

11. A method as recited in claim 1, wherein the session state information comprises a secure socket layer (SSL) session state or a transport layer security (TLS) session state.

12. A method as recited in claim 1, wherein the intermediary component, the access component, and the service or resource are each implemented by different computing devices.

13. A method implemented by an access component, the method comprising:
receiving, by the access component, a first request from a user of the access component to access a service or resource without user credentials of the user being revealed to the access component;
sending, by the access component, to an intermediary component and in response to the first request, a second request to access the service or resource based on the user credentials for the user, the intermediary component comprising a user credential management module configured to manage the user credentials, a user authentication module, and an I/O module configured to receive the user credentials via user input to the intermediary component;
receiving, by the access component, from the user authentication module of the intermediary component and in response to the second request, session state information received by the intermediary component from the service or resource; and
communicating, by the access component and using the session state information, with the service or resource.

14. A method as recited in claim 13, wherein the second request includes an indication of the service or resource.

15. A method as recited in claim 13, wherein the session state information allows the access component and the service or resource to communicate with one another without the user credentials being revealed to the access component.

16. A method as recited in claim 15, wherein the session state information comprises a cookie.

17. A method as recited in claim 13, further comprising receiving the session state information and communicating with the service or resource using the session state information only if both the user credentials associated with the service or resource are present in a user credential store of the intermediary component and the user credentials are authenticated by the service or resource.

18. A method as recited in claim 13, wherein the communicating comprises communicating with the service or resource independently of the intermediary component.

19. One or more computer storage media having stored thereon multiple instructions that, responsive to execution by one or more processors of an intermediary component, cause the one or more processors to perform acts comprising:

receiving, from an access component, a first request to access a service, wherein each of the access component and the service and the intermediary component are implemented by different computing devices, and wherein credentials of a user of the access component are not revealed to the access component;

receiving, by the intermediary component, the user credentials of the user of the access component, the intermediary component comprising a user credential management module for managing the user credentials and a user authentication module;

displaying, in response to the first request, a user interface prompting the user to authorize sending of user credentials to the service;

checking whether the user authorizes sending of the user credentials to the service at the user authentication module of the intermediary component;

if the user does not authorize sending of the user credentials to the service then denying the first request; and if the user authorizes sending of the user credentials to the service then:

obtaining, from a credential store of the intermediary component, previously stored user credentials for the user of the access component, wherein the user credentials are associated with the service;

sending, to the service, both a second request to access the service and the user credentials;

receiving, in response to the second request, session state information;

returning the session state information to the access component, wherein the session state information allows the access component and the service to communicate with each other independently of the intermediary component and without the user credentials being revealed to the access component.

20. A method as recited in claim 1, wherein the access component is implemented on a separate device from the intermediary component, the method further comprising:

displaying, at the intermediary component, a user interface identifying the service or resource and prompting the current user to authorize sending of the user credentials to the service or resource, the service or resource being implemented on a separate device from the access and intermediary components;

if the current user does not authorize sending of the user credentials to the service or resource then denying the first request; and if the current user does authorize sending of the user credentials to the service or resource then performing the sending, the receiving the session state information, and the returning the session state information to the access component.

21. A computing device implementing an intermediary component, the computing device comprising:

one or more processors; and one or more computer storage media having stored thereon multiple instructions that, responsive to execution by the one or more processors, cause the one or more processors to perform acts comprising:

receiving, by the intermediary component and from an access component, a first request to access a service or resource without user credentials of a current user of the access component being revealed to the access component;

receiving, by the intermediary component, the user credentials of the current user of the access component, the intermediary component comprising a user credential management module and a user authentication module;

obtaining, by the intermediary component and in response to the first request, the user credentials for the current user, wherein the user credentials are associated with the service or resource, and the user credentials are managed by the user credential management module;

identifying, by the user authentication module, the user credentials to provide to the service;

sending, by the user authentication module of the intermediary component and to the service or resource, both a second request to access the service or resource and the user credentials;

receiving, by the intermediary component and in response to the second request, session state information from the service or resource; and returning, by the intermediary component, the session state information to the access component so that the access component and the service or resource can communicate with each other independently of the intermediary component.

22. A computing device as recited in claim 21, the acts further comprising:

checking whether a user authorization to send the user credentials to the service or resource is received at the intermediary component; and sending the user credentials to the service or resource only if the user authorization to send the user credentials to the service or resource is received at the intermediary component, otherwise returning an indication to the access component that the first request is denied.

23. A computing device as recited in claim 21, the acts further comprising:

checking a user credential store of the intermediary component to determine whether user credentials associated with the service or resource are present in the user credential store; and sending the user credentials to the service or resource only if user credentials associated with the service or resource are present in the user credential store, otherwise returning an indication to the access component that the first request is denied.

24. A computing device implementing an access component, the computing device comprising:

one or more processors; and one or more computer storage media having stored thereon multiple instructions that, responsive to execution by the one or more processors, cause the one or more processors to perform acts comprising:

receiving, by the access component, a first request from a user of the access component to access a service or resource without user credentials of the user being revealed to the access component;

sending, by the access component, to an intermediary component and in response to the first request, a second request to access the service or resource based on the user credentials for the user, the intermediary component comprising a user credential management module configured to manage the user credentials, a user authentication module, and an I/O module configured to receive the user credentials via user input to the intermediary component;

receiving, by the access component, from the user authentication module of the intermediary component and in response to the second request, session state information received by the intermediary component from the service or resource; and communicating, by the access component and using the session state information, with the service or resource.

25. A computing device as recited in claim 24, wherein the session state information allows the access component and the service or resource to communicate with one another without the user credentials being revealed to the access component.

26. A computing device as recited in claim 24, the acts further comprising receiving the session state information and communicating with the service or resource using the session state information only if both the user credentials associated with the service or resource are present in a user credential store of the intermediary component and the user credentials are authenticated by the service or resource.

* * * * *